United States Patent [19]

Sasaki et al.

[11] Patent Number: 5,132,359
[45] Date of Patent: * Jul. 21, 1992

[54] VINYL CHLORIDE RESIN COMPOSITION

[75] Inventors: Isao Sasaki; Naoki Yamamoto, both of Hiroshima; Akira Yanagase, Ohtake, all of Japan

[73] Assignee: Mitsubishi Rayon Company, Ltd., Tokyo, Japan

[*] Notice: The portion of the term of this patent subsequent to Feb. 19, 2008 has been disclaimed.

[21] Appl. No.: 552,081

[22] Filed: Jul. 13, 1990

Related U.S. Application Data

[63] Continuation-in-part of Ser. No. 299,433, Jan. 23, 1989, Pat. No. 4,994,522.

[30] Foreign Application Priority Data

Jan. 25, 1988 [JP] Japan .................. 63-14290

[51] Int. Cl.$^5$ ................................ C08L 51/04
[52] U.S. Cl. ........................ 525/63; 525/64; 525/903
[58] Field of Search ............... 525/63, 64, 479, 903

[56] References Cited

U.S. PATENT DOCUMENTS

| | | | |
|---|---|---|---|
| 3,686,356 | 8/1972 | Saam | 525/63 |
| 3,808,180 | 4/1974 | Owens et al. | 525/291 |
| 3,923,923 | 12/1975 | Fiedler | 525/63 |
| 4,690,986 | 9/1987 | Sasaki et al. | 525/479 |
| 4,877,831 | 10/1989 | Hungo et al. | 525/63 |
| 4,894,415 | 1/1990 | Sasaki et al. | 525/68 |
| 4,994,522 | 2/1991 | Sasaki et al. | 525/63 |
| 4,994,523 | 2/1991 | Sasaki et al. | 525/63 |

FOREIGN PATENT DOCUMENTS

| | | | |
|---|---|---|---|
| 0231776 | 8/1987 | European Pat. Off. | 525/63 |
| 0260552 | 3/1988 | European Pat. Off. | |
| 61-209247 | 9/1986 | Japan | 525/63 |
| 61-235462 | 10/1986 | Japan | 525/63 |

OTHER PUBLICATIONS

Chemical Abstract, vol. 107, No. 20, Abstract No. 176856a (1987).

*Primary Examiner*—John C. Bleutge
*Assistant Examiner*—R. Dean, Jr.
*Attorney, Agent, or Firm*—Cushman, Darby & Cushman

[57] ABSTRACT

A vinyl chloride resin composition having excellent impact resistance even at a low temperature and good weather resistance is disclosed. Such vinyl chloride resin composition comprises:

(A) a vinyl chloride resin, and
(B) a compound rubber type graft copolymer wherein one or more vinyl monomers are graft-polymerized onto a compound rubber that has an average particle diameter of 0.08 to 0.6 μm and possesses such a structure that 1 to 10 wt. % of a polyorganosiloxane rubber component and 90 to 99 wt. % of a polyalkyl (meth)acrylate rubber component are entangled in an inseparable fashion, and the total amount of the polyorganosiloxane rubber component and the polyalkyl (meth)acrylate rubber component is 100 wt. %.

10 Claims, No Drawings

VINYL CHLORIDE RESIN COMPOSITION

This is a continuation-in-part application of an application having Ser. No. 7/299,433, filed Jan. 23, 1989, now U.S. Pat. No. 4,994,522.

The present invention relates to a resin composition excellent in impact resistance, and, more particularly to a vinyl chloride resin composition excellent in impact resistance consisting of a vinyl chloride resin and a specific graft copolymer containing a polyorganosiloxane rubber.

Since vinyl chloride resins are inexpensive, and have various excellent chemical properties and physical properties, the production of vinyl chloride resins is largest among synthetic resins, and the resins are used in various fields. Since as well known, molded articles made up only of a vinyl chloride resin have a major defect that the molded articles are fragile to impact, many proposals have been made to overcome this defect. The most effective method thereof is one wherein a graft copolymer obtained by graft polymerization of a monomer such as styrene, acrylonitrile, and methyl methacrylate onto a rubber-like elastomer (elastic solid) is mixed with a vinyl chloride resin. In connection with the method, there are many technical reports and patents (e.g. Japanese Patent Publication Nos. 22339/1981, 26536/1982, and 27689/1985). Such a graft copolymer has already been on the market as an impact modifier for vinyl chloride resins, and has contributed considerably to enlarge the application of vinyl chloride resin products. However, in certain application, viz., in application at low temperatures, a composition having a higher impact strength than that of known compositions is demanded. Therefore, a modifier having super-high impact resistance has been a big subject for a long period of time in the arts, and if it is realized, larger application can be expected.

Taking the above circumstances into consideration, extensive researches have been conducted for the purpose of improving the characteristics of the vinyl chloride resins, and have found that by blending a compound rubber type graft copolymer, which is obtained by graft-polymerizing a vinyl monomer onto a compound rubber consisting of a polyorganosiloxane rubber component and a polyalkyl (meth)acrylate rubber component, with a vinyl chloride resin, a vinyl chloride resin composition having excellent impact resistance, particularly impact resistance at low temperature, and weather resistance that have not been attained hitherto can be obtained.

The present invention provides a vinyl chloride resin composition, comprising:

(A) a vinyl chloride resin, and (b) a compound rubber type graft copolymer wherein one or more vinyl monomers are graft-polymerized onto a compound rubber that has such a structure that 1 to 10 wt. %, preferably 3 to 10 wt. % of a polyorganosiloxane rubber component and 90 to 99 wt. %, preferably 90 to 97 wt. % of a polyalkyl (meth)acrylate rubber component are entangled in an inseparable fashion, and the total amount of the polyorganosiloxane rubber component and the polyalkyl (meth)acrylate rubber component is 100 wt. %.

The vinyl chloride resin (A) used in the present invention includes homopolymers of vinyl chloride, and copolymers of 80 wt. % or more of vinyl chloride and up to 20 wt. % of other monomer copolymerizable with vinyl chloride. As copolymerizable other monomers, vinyl acetate, ethylene, acrylates, and vinyl bromide can be mentioned.

The compound rubber type graft copolymer (B) used in the present invention refers to a copolymer wherein one or more vinyl monomers are graft-polymerized onto a compound rubber that has an average particle diameter of 0.08 to 0.6 μm and possesses such a structure that 1 to 10 wt. %, preferably 3 to 10 wt. %, more preferably 5 to 10 wt. % of a polyorganosiloxane rubber component and 90 to 99 wt. %, preferably 90 to 97 wt. %, more preferably 90 to 95 wt. % of a polyalkyl (meth)acrylate rubber component are entangled in an inseparable fashion, with the total amount of the polyorganosiloxane rubber component and the polyalkyl (meth)acrylate rubber component being 100 wt. %.

It is impossible to obtain the excellent properties of the resin composition of the present invention even if either the polyorganosiloxane rubber component or the polyalkyl (meth)acrylate rubber component, or a simple mixture of the two rubber components is used as the rubber source instead of the above-mentioned compound rubber. When the polyorganosiloxane rubber component and the polyalkyl (meth)acrylate rubber component are entangled to form a unitary composite, it is for the first time possible to obtain a vinyl chloride resin composition superior in impact resistance, particularly impact resistance at low temperatures, and weather resistance.

If the amount of polyalkyl (meth)acrylate rubber component exceeds 99 wt. %, the impact resistance of a molded article of the obtained resin composition becomes deteriorated. Therefore, the amount of the polyalkyl (meth)acrylate rubber component constituting the compound rubber is required to be in the range of from 90 to 99 wt. % (provided that the total amount of the two rubber components is 100 wt. %), and preferably in the range of 90 to 97 wt. % and more preferably in the range of 90 to 95 wt. %. The average particle diameter of said compound rubber is required to be in the range of from 0.08 to 0.6 μm. If the average particle diameter is less than 0.08 μm, the impact resistance of a molded article of the obtained resin composition becomes deteriorated, while if the average particle diameter exceeds 0.6 μm, the impact resistance of a molded article from the obtained resin composition becomes deteriorated, and also the surface appearance of the molded article becomes deteriorated. Emulsion polymerization is most suitable to obtain the compound rubber having such an average particle diameter. It is preferred that firstly a latex of the polyorganosiloxane rubber is prepared, and then the rubber particles of the polyorganosiloxane rubber latex are impregnated with an alkyl (meth)acrylate and the alkyl (meth)acrylate is subjected to polymerization.

The polyorganosiloxane rubber constituting the above compound rubber may be prepared by emulsion polymerization using an organosiloxane and a crosslinking agent (I) as described hereinafter. At that time, a graftlinking agent (II) may be used additionally.

Examples of the organosiloxane include various types of cyclic siloxanes of at least three-memberd ring, preferably from 3- to 6-membered cyclosiloxanes. For example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane can be mentioned, which may be used alone or in combination as a mixture of two or more different types. The organosiloxane is used in an amount of 50 wt. % or over, preferably 70 wt. % or over, of the polyorganosiloxane rubber component.

As the crosslinking agent (I), can be used a trifunctional or tetrafunctional silane type crosslinking agent, such as trimethoxymethylsilane, triethoxyphenylsilane, tetramethoxysilane, tetraethoxysilane, tetra-n-propoxysilane, and tetrabutoxysilane. Particularly, tetrafunctional crosslinking agent are preferable, and of these, tetraethoxysilane is especially preferable. The crosslinking agent is used in an amount of 0.1 to 30 wt. % of the polyorganosiloxane rubber component.

As the graftlinking agent (II), can be used, for example, a compound capable of forming a unit represented by the formula:

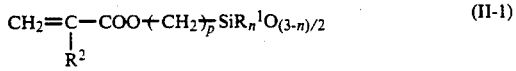

(II-1)

(II-2)

or

(II-3)

wherein $R^1$ is a methyl group, an ethyl group, a propyl group, or a phenyl group, $R^2$ is a hydrogen atom, or a methyl group, n is 0, 1, or 2, and p is a number of 1 to 6.

A (meth)acryloyloxysiloxane capable of forming the unit of the formula (II-1) has a high graft efficiency and thus is capable of forming effective graft chains, and it is advantageous from the viewpoint of providing impact resistance. A methacryloyloxysiloxane is particularly preferable as the compound capable of forming the unit of the formula (II-1). Specific examples of the methacryloyloxysiloxane include β-methacryloyloxyethyl-dimethoxymethylsilane, γ-methacryloyloxypropylmethoxydimethylsilane, γ-methacryloyloxy-propyldimethoxymethylsilane, γ-methacryloyloxypropyl-trimethoxysilane, γ-methacryloyloxypropylethoxy-diethylsilane, γ-methacryloyloxypropyldiethoxymethyl-silane, and δ-methacryloyloxybutyldiethoxymethylsilane. The grafting agent is used in an amount of 0 to 10 wt. % of the polyorganosiloxane rubber component.

The latex of this polyorganosiloxane rubber component may be produced by a process disclosed, for example, in U.S. Pat. Nos. 2,891,290 and 3,294,725. In the present invention, such a latex is preferably produced, for example, in such a manner that a solution mixture of the organosiloxane, the crosslinking agent (I), and, if desired, the graftlinking agent (II) are subjected to shear-mixing with water by means of e.g. a homogenizer in the presence of a sulfonic acid type emulsifier such as an alkylbenzenesulfonic acid and an alkylsulfonic acid. An alkylbenzenesulfonic acid is preferable since it serves not only as an emulsifier for the organosiloxane but also as a polymerization initiator. Further, it is preferable to combine a metal salt of an alkylbenzenesulfonic acid, or a metal salt of an alkylsulfonic acid, since such combined use is effective for maintaining the polymer under a stabilized condition during the graft polymerization.

Next, the polyalkyl (meth)acrylate rubber component constituting the compound rubber may desirably be prepared by using an alkyl (meth)acrylate, a crosslinking agent (III) and a graftlinking agent (IV) as described hereinafter.

Examples of the alkyl (meth)acrylate include alkyl acrylates such as methyl acrylate, ethyl acrylate, n-propyl acrylate, n-butyl acrylate, and 2-ethylhexyl acrylate, and alkyl methacrylates such as hexyl methacrylate, 2-ethylhexyl methacrylate, and n-lauryl methacrylate, with n-butyl acrylate preferably used.

Examples of the crosslinking agent (III) include ethylene glycol dimethacrylate, propylene glycol dimethacrylate, 1,3-butylene glycol dimethacrylate, and 1,4-butylene glycol dimethacrylate.

Examples of the graftlinking agent (IV) include allyl methacrylate, trially cyanurate and triallyl isocyanurate. Allyl methacrylate can be used also as a crosslinking agent.

These crosslinking agents and graftlinking agents may be used alone or in comination as a mixture of two or more different types. The total amount of such crosslinking agent and graftlinking agent is 0.1 to 20 wt. % of the polyalkyl (meth)acrylate rubber component.

The polymerization of the polyalkyl (meth)acrylate rubber component is conducted by adding a monomer mixture of the alkyl (meth)acrylate, the crosslinking agent and the graftlinking agent into the latex of the polyorganosiloxane rubber component neutralized by the addition of an aqueous solution of an alkali such as sodium hydroxide, potassium hydroxide, or sodium carbonate, and impregnating the monomer into the polyorganosiloxane rubber particles, followed by addition of a usual radical polymerization initiator and heating them to polymerize. As the polymerization progresses, a crosslinked network of a polyalkyl (meth)acrylate rubber entangled with the crosslinked network of the polyorganosiloxane rubber will be formed to obtain a latex of a compound rubber wherein the polyorganosiloxane rubber component and the polyalkyl (meth)acrylate rubber component are entangled in an inseparable fashion. In carrying out the present invention, as the compound rubber, it is preferable to use a compound rubber wherein the main skeleton of the polyorganosiloxane rubber component has repeating units of dimethylsiloxane, and the main skeleton of the polyalkyl (meth)acrylate rubber component has repeating units of n-butyl acrylate.

The compound rubber thus prepared by emulsion polymerization is graft-copolymeizable with a vinyl monomer. Further, the polyorganosiloxane rubber component and the polyalkyl (meth)acrylate rubber component are firmly entangled, so that they cannot be separated by extraction with a usual organic solvent such as acetone or toluene. The gel content of the compound rubber measured by extraction with toluene at 90° C. for 12 hours is at least 80 wt. %.

The vinyl monomer to be graft-polymerized onto this compound rubber may be various monomers including an aromatic alkenyl compound such as styrene, α-methylstyrene, or vinyltoluene; a methacrylate such as methyl methacrylate or 2-ethylhexyl methacrylate; an acrylate such as methyl acrylate, ethyl acrylate, or butyl acrylate; and vinyl cyanide compound such as acrylonitrile or methacrylonitrile. These vinyl monomers may be used alone or in combination as a mixture of two or more different types. Of these vinyl monomers, a methacrylate is preferable, with methyl methacrylate particularly preferable.

The proportions of the compound rubber and the vinyl monomer in the compound rubber type graft copolymer (B) are preferably such that the compound rubber is 30 to 95 wt. %, preferably 40 to 90 wt. %, and the vinyl monomer is 5 to 70 wt. %, preferably 10 to 60 wt. %, based on the weight of the graft copolymer (B). If the vinyl monomer is less than 5 wt. %, the dispersion of the graft copolymer (B) in the resin composition is not enough, while if it exceeds 70 wt. %, the effect for the improvement of the impact strength lowers.

The vinyl monomer is added to a latex of the compound rubber and then polymerized in a single step or in multi-steps by a radical polymerization technique to obtain a latex of the compound type graft copolymer (B). The latex thus obtained is poured into hot water in which a metal salt such as calcium chloride or magnesium sulfate is dissolved, followed by salting out and coagulation to separate and recover the compound rubber type graft copolymer (B).

It is preferable that, in the vinyl chloride resin composition of the present invention, the cotnent of the compound rubber type graft copolymer (B) in the entire resin composition is in the range of 3 to 40 wt. %. If the content of the compound rubber type graft copolymer (B) is less than 3 wt. %, the effect for improvement of impact resistance of the vinyl chloride resin is low, while if the content is more than 40 wt. %, the impact resistance is good but it is not preferable because it is not economical.

The mixing of the vinyl chloride resin and the compound rubber type graft copolymer resin is usually carried out by a known kneading machine. Examples of such a machine include mixing rolls, calender rolls, a Banbury mixer, an extruder, a blow molder, and an inflation molding machine.

The vinyl chloride resin composition of the present invention may further contain, if necessary, a dyestuff, a pigment, a stabilizer, a reinforcing material, a filler, a flame retardant, etc.

Now, the present invention will be described in further detail with reference to Examples. However, it should be understood that the present invention is by no means restricted by such specific Examples. In these Examples, "parts" means "parts by weight".

EXAMPLES

The physical properties in Examples and Comparative Examples were measured as follows:

Izod impact strength: Izod impact strength was measured according to ASTM D 256 using a notched test piece of ¼" thickness.

Impact retention ratio: Impact retention ratio was measured using a notched test piece of ¼" thickness according to ASTM D 256 at 23° C. The Izod impact strength of the test piece before the exposure to a sunshine weatherometer was assumed 100%, and the ratio of the Izod impact strength after the exposure to the Izod impact strength before the exposure was designated as the retenion ratio.

The difference of the yellow indices before and after the exposure to a sunshine weatherometer: The difference of the yellow indices (YI) of the sample before and after the exposure to a sunshine weatherometer were measured in accordance with JIS K-7103.

REFERENCE EXAMPLE 1

Production of a Compound Rubber Type Graft Copolymer (S-1)

Two parts of tetraethoxysilane, 0.5 parts of γ-methacryloyloxypropyldimethoxymethylsilane, and 97.5 parts of octamethylcyclotetrasiloxane were mixed to obtain 100 parts of siloxane mixture. Then, 100 parts of the siloxane mixture were added to 200 parts of distilled water having 1 part of sodium dodecylbenzene sulfonate and 1 part of dodecylbenzene sulfonic acid dissolved therein. The mixture was preliminarily stirred at 10,000 rpm by a homomixer and then emulsified and dispersed by a homogenizer under a pressure of 300 Kg/cm$^2$ to obtain an organosiloxane latex. This mixture was transferred to a separable flask equipped with a condenser and a stirrer, heated at 80° C. for 5 hours under stirring, and then left at 20° C. for 48 hours. Then, this latex was neutralized to pH 7.4 with an aqueous sodium hydroxide solution to stop the polymerization to obtain a polyorganosiloxane rubber latex 1. The ratio of polymerization of the organosiloxane was 89.5%, and the average particle diameter of the polyorganosiloxane rubber was 0.16 μm.

Then, 20 parts of the polyorganosiloxane rubber latex 1 were introduced into a separable flask equipped with a stirrer, and 150 parts of distilled water and 0.25 parts of sodium dodecylbenzene sulfonate were added thereto. After flushing with nitrogen, the mixture was heated to 50° C., and a mixed solution comprising 77.5 parts of n-butyl acrylate, 1.5 parts of allyl methacrylate, and 0.26 parts of tert-butyl hydroperoxide was changed, and the mixture was stirred for 30 min to impregnate the mixed solution into the polyorganosiloxane rubber particles. Then, a mixed solution comprising 0.002 parts of ferrous sulfate, 0.006 parts of disodium ethylenediaminetetraacetate, 0.26 parts of Rongalit and 5 parts of distilled water was charged thereto to initiate radical polymerization, and the internal temperature was maintained at 70° C. for 2 hours to complete the polymerization reaction to obtain a compound rubber latex. A part of this latex was sampled, and the average particle diameter of the rubber was measured to find to be 0.26 μm. This latex was dried to obtain a solid product, which was extracted with toluene at 90° C. for 12 hours, whereby the gel content was measured to find to be 96.3 wt. %. To 250 parts of this compound rubber latex, a mixed solution comprising 0.06 parts of tert-butyl hydroperoxide, and 15 parts of methyl methacrylate was added dropwise over a period of 15 min, and the mixture was maintained at 70° C. for 4 hours to complete the graft polymerization of the methyl methacrylate to the compound rubber. The ratio of polymerization of the methyl methacrylate was 99.4%. The graft copolymer latex thus obtained was added dropwise to 250 parts of hot water containing 1.5 wt. % of calcium chloride and coagulated, and the coagulated product was separated, washed and dried at 75° C. for 16 hours to obtain 97.6 parts of a compound rubber type graft copolymer (hereinafter referred to as S-1) as a dry powder.

REFERENCE EXAMPLE 2

Production of a Compound Rubber Type Graft Copolymer (S-2)

Two parts of tetraethoxysilane, and 98 parts of octamethylcyclotetrasiloxane were mixed to obtain 100 parts of a mixed siloxane. Then, 100 parts of the mixed siloxane were added to 200 parts of distilled water having 1 part of sodium dodecylbenzene sulfonate and 1 part of dodecylbenzene sulfonic acid dissolved therein. The mixture was preliminarily dispersed by a homomixer and then emulsified and dispersed by a homogenizer in the same way as for the production of graft copolymer S-1. The dispersed product was then heated to 80° C. for 5 hours, cooled, allowed to stand for 48 hours at 20° C., and finally neutralized to a pH of 6.9 with an aqueous sodium hydroxide solution to stop the polymerization thereby obtaining a polyorganosiloxane rubber latex 2. The ratio of polymerization of the organosiloxane was 88.9%, and the average particle diameter of the polyorganosiloxane rubber was 0.16 μm.

Then 20.2 parts of the polyorganosiloxane rubber latex 2 were introduced into a separable flask equipped with a condenser and a stirrer, and 150 parts of distilled water and 0.25 parts of sodium dodecylbenzene sulfonate were added thereto. After flushing with nitrogen, the mixture was heated to 50° C., and a mixed solution comprising 77.5 parts of n-butyl acrylate, 1.5 parts of allyl methacrylate, and 0.26 parts of tert-butyl hydroperoxide was charged, and the mixture was stirred for 30 min. Polymerization of the n-butyl acrylate and allyl methacrylate was carried out in the same way and under the same conditions as for the production of graft copolymer S-1 to obtain a compound rubber latex. The average particle diameter of the compound rubber was 0.26 μm, and the gel content of the rubber measured by the toluene extraction method in the same way as in Reference Example 1 was 94.2 wt. %. A mixture of 15 parts of methyl methacrylate and 0.06 parts of tert-butyl hydroperoxide was added to the compound rubber latex, and the graft polymerization of the methyl methacrylate was carried out under the same conditions as for S-1. The graft copolymer latex thus obtained was coagulated, and the coagulated product was separated, washed and dried in the same way as in Reference Example 1 to obtain 97.7 parts of a dry powder of a compound rubber type graft copolymer (hereinafter referred to as S-2).

REFERENCE EXAMPLE 3

Production of Compound Rubber Type Graft Copolymers (S-3 to S-5)

The polyorganosiloxane rubber latex 1 prepared in the production of the compound rubber type graft copolymer S-1 was used to produce compound rubber type graft copolymers under the same conditions as in Reference Example 1 except that such amounts of distilled water, n-butyl acrylate and allyl methacrylate as shown in Table 1 below were used to form butyl acrylate rubber component.

TABLE 1

| Component | Compound rubber latex | | |
|---|---|---|---|
| | 3 | 4 | 5 |
| Polyorganosiloxane rubber latex 1 (parts) | 0 | 5.7 | 14.2 |
| Distilled water (parts) | 150 | 150 | 150 |
| Butyl acrylate (parts) | 83.3 | 81.6 | 79.1 |
| Allyl methacrylate (parts) | 1.7 | 1.7 | 1.7 |
| Tert-butyl hydroxide | 0.26 | 0.26 | 0.26 |

TABLE 1-continued

| Component | Compound rubber latex | | |
|---|---|---|---|
| | 3 | 4 | 5 |
| (parts) | | | |
| Average particle diameter of compound rubber (μm) | 0.26 | 0.30 | 0.26 |
| Gel content of compound rubber (wt. %) | 95.5 | 97.3 | 96.6 |

A mixture of 15 parts of methyl methacrylate and 0.06 parts of tert-butyl hydroperoxide was added to each of the compound rubber latices, then the graft polymerization of methyl methacrylate onto the compound rubber was carried out under the same conditions as in Reference Example 1, and after the completion of the polymerization reaction, each of the latices thus obtained was coagulated, and the coagulated product was separated and dried in the same way as in Reference Example 1 to obtain dry powders of compound rubber type graft copolymers (hereinafter referred to as S-3 to S-5, respectively).

REFERENCE EXAMPLE 4

Production of a Graft Copolymer (S-6)

Twenty parts of the polyorganosiloxane rubber latex 1 were weighed and introduced together with 150 parts of distilled water and 0.25 parts of sodium dodecylbenzene sulfonate into a separable flask equipped with a stirrer. After flushing with nitrogen, the mixture was heated to 50° C., and a mixed solution comprising 77.5 parts of n-butyl acrylate, 0.26 parts of tert-butyl hydroperoxide was charged, and the mixture was stirred for 30 min. Thereafter, the same polymerization initiator in the same amount as in Reference Example 1 was added to effect the emulsion polymerization to obtain a rubber latex. This case was different from Reference Example 1 in that allyl methacrylate was not added. The average particle diameter of the polymer of the rubber latex and the gel content of the rubber measured by the toluene extraction method were 0.26 μm, and 6.9 wt. %, respectively. To this rubber latex was added dropwise a mixed solution comprising 15 parts of methyl methacrylate and 0.12 parts of tert-butyl hydroperoxide at 70° C. over 15 min.

Thereafter the mixture was kept at 70° C. for 4 hours to effect the graft polymerization, and after the completion of the polymerization reaction, coagulation, separation and drying of the rubber were carried out in the same manner as in Reference Example 1 to obtain a dry powder of a graft copolymer (hereinafter referred to as S-6).

REFERENCE EXAMPLE 5

Production of Graft Copolymers (S-7 and S-8)

A mixed solution comprising 0.05 parts of tert-butyl hydroperoxide, 15 parts of styrene and 10 parts of methyl methacrylate was added dropwise to 265 parts of the compound rubber latex prepared in the production of the compound rubber type graft copolymer S-1 over a period of 30 min. at 70° C., and the mixture was maintained at 70° C. for 2 hours to complete the graft polymerization of methyl methacrylate to the compound rubber. The graft copolymer latex thus obtained was coagulated, and the coagulated product was separated, washed and dried in the same way as in Reference Example 1 to obtain 93.4 parts of a dry powder of a compound rubber type graft copolymer (hereinafter referred to as S-7).

Also, a mixed solution comprising 0.1 parts of tert-butyl hydroperoxide and 30 parts of methyl methacrylate was added dropwise to 206 parts of the compound rubber latex prepared in the production of the compound rubber type graft copolymer S-1 over a period of 30 min. at 70° C., and the mixture was maintained at 70° C. for 2 hours to complete the graft polymeization of styrene to the compound rubber. The graft copolymer latex thus obtained was coagulated, and the coagulated product was separated, washed and dried in the same way as in Reference Example 1 to obtain 94.4 parts of a dry powder of a compound rubber type graft copolymer (hereinafter referred to as S-8).

REFERENCE EXAMPLE 6

Production of Graft Copolymer (S-9)

One part of ethyl orthosilicate, 0.75 parts of γ-methacryloyloxypropyldimethoxymethylsilane and 100 parts of octamethylcyclotetrasiloxane (hereinafter referred to as organosiloxane) were mixed to obtain a siloxane mixture. This mixture was added to 300 parts of distilled water having 1.0 part of dodecylbenzene sulfonic acid dissolved therein. The mixture was preliminarily stirred by a homomixer and then emulsified by passing a homogenizer twice under a pressure of 250 Kg/cm$^2$.

This emulsion was transferred to a separable flask equipped with a condenser, an inlet for nitrogen gas and a stirrer, heated at 90° C. for 6 hours under stirring to complete polymerization of the organosiloxane and to obtain a polyorganosiloxane latex. The ratio of polymerization of the organosiloxane was 90.3% and the average particle diameter of the polyorganosiloxane rubber was 0.14 μm.

This latex was neutralized to pH 8 with an aqueous solution of sodium carbonate.

To this latex was dissolved 700 parts of distilled water and 1.5 parts of potassium persulfate, and then the latex was transferred to a separable flask equipped with a bottle for dropping monomers, a condenser, an inlet for nitrogen gas and a stirrer, heated to 75° C. while flushing with nitrogen gas. Then, a monomer mixture of 50 parts of acrylonitrile and 150 parts of styrene was slowly added to the flask through the dropping bottle.

After finishing the dropping of the monomer mixture, the monomer mixture was subjected to polymerization reaction for 2 hours at 65° C. to substantially complete the polymerization and then the reaction product (latex) was cooled. Average particle diameter of the graft copolymer in the latex thus obtained was 0.30 μm.

This latex was poured into hot water having 15 parts of hydrated calcium chloride (CaCl$_2$·2H$_2$O) to separate the polymer by the salting out.

After sufficiently washed with water, the polymer was dried at 80° C. for 16 hours to obtain a polyorganosiloxane type graft copolymer (hereinafter referred to as S-9).

The ratio of the grafted polymer portion in the whole graft copolymer (S-9) was 93.5% and degree of the grafting was 46.8%. Polymerization degree of the grafting monomers was 99.8%.

EXAMPLES 1 TO 4, AND COMPARATIVE EXAMPLES 1 AND 2

A polyvinyl chloride resin having a degree of polymerization of 700 (hereinafter referred to as PVC), and compound rubber type graft copolymer S-1 or S-2 obtained in Reference Example 1 or 2 was mixed in proportions as shown in Table 2. To 100 parts of each of the mixtures were added 3 parts of dibutyltin maleate, 1 part of butyl stearate, 0.5 parts of stearyl alcohol, and 0.2 parts of a lubricant (Lixol G-47" (trade name) manufactured by Henkel KGaA), the mixture was stirred by a Henschel mixer for 10 min, then kneaded by mixing rolls at a temperature of 165° C. (lower level) for about 3 min and at a temperature of 195° C. (higher level) for about 4 min, and was pressure-molded for 10 min under a pressure of 100 Kg/cm$^2$ into a sample piece. From the sample pieces thus prepared, test pieces were formed and the Izod impact strength was measured. The results are shown in Table 2.

TABLE 2

|  | Compound rubber type graft copolymer | | PVC | Izod impact strength | |
|---|---|---|---|---|---|
|  | Type | (parts) | (parts) | 23° C. | 0° C. |
| Example 1 | S-1 | 10 | 90 | 99 | 20 |
| Example 2 | S-1 | 15 | 85 | 174 | 46 |
| Example 3 | S-1 | 20 | 80 | 173 | 170 |
| Example 4 | S-2 | 15 | 85 | 171 | 165 |
| Comparative Example 1 | Metablen ® C-100* | 10 | 90 | 15.6 | 6.8 |
| Comparative Example 2 | Metablen ® W-300* | 10 | 90 | 6.4 | 3.2 |

*An impact modifier for vinyl chloride resin manufactured by Mitsubishi Rayon Co., Ltd.
**An impact modifier for vinyl chloride resin manufactured by Mitsubishi Rayon Co., Ltd.

As apparent from the results shown in Table 2, it can be understood that the resin compositions according to the present invention were improved remarkably in their impact resistance at a low temperature.

EXAMPLE 5, AND COMPARATIVE EXAMPLES 3 AND 4

Example 1, and Comparative Examples 1 to 2 were repeated in the same way except that the compound rubber type graft copolymer (S-1) and the impact modifiers were used in such proportions as shown in Table 3 to prepare 100 parts of each of mixtures, thereby obtaining test pieces.

The obtained test pieces were subjected to a weather resistance test using a sunshine weatherometer, and the impact retention ratio after the exposure for 500 hours, the yellow indices $YI_1$ and $YI_2$ before and after the exposure for 1,000 hours were measured to find its difference $YI = YI_2 - YI_1$. The results are shown in Table 3.

TABLE 3

|  | Compound rubber type graft copolymer | | PVC parts | Impact retention radio after exposure for 500 hours by sunshine weatherometer | Difference YI between yellow indices before and after exposure for 1,000 hours by weatherometer |
|---|---|---|---|---|---|
|  | Type | parts |  |  |  |
| Example 5 | S-1 | 15 | 85 | 87 | 12 |
| Comparative | Metablen ® | 15 | 85 | 23 | 96 |

TABLE 3-continued

| | Compound rubber type graft copolymer Type | PVC parts | Impact retention radio after exposure for 500 hours by sunshine weatherometer | Difference YI between yellow indices before and after exposure for 1,000 hours by weatherometer |
|---|---|---|---|---|
| Example 3 Comparative Example 4 | C-100 Metablen ® W-300 | 15 | 85 | 81 | 21 |

As apparent from the results shown in Table 3, it can be understood that the resin composition according to the present invention exhibited excellent performance in the weather resistance test. Although the resin composition of Comparative Example 4 exhibited good weather resistance, it was not good because it was low in impact resistance at room temperature and at a low temperature as apparent from the results of Comparative Example 2.

EXAMPLES 6 AND 7, AND COMPARATIVE EXAMPLE 5

Example 1 was repeated to prepare test pieces except that the compound rubber type graft copolymers (S-3) to (S-5) obtained in Reference Example 3 were used.

The obtained test pieces were used to measure the Izod impact strength. The results are shown in Table 4.

TABLE 4

| | Compound rubber type graft copolymer | | PVC | Izod impact strength | |
|---|---|---|---|---|---|
| | Type | (parts) | (parts) | 23° C. | 0° C. |
| Comparative Example 5 | S-3 | 10 | 90 | 7.2 | 4.5 |
| Example 6 | S-4 | 10 | 90 | 54 | 12 |
| Example 7 | S-5 | 10 | 90 | 78 | 23 |

As apparent from the results shown in Table 4, it can be understood that the resin composition according to the present invention were improved remarkably in impact resistance at room temperature and at a low temperature.

COMPARATIVE EXAMPLE 6

Example 1 was repeated to prepare test pieces except that the graft copolymer (S-6) obtained in Reference Examples 4 was used.

The obtained test pieces were used to measure the Izod impact strength. The results are shown in Table 5.

TABLE 5

| | Compound rubber type type graft copolymer | | PVC | Izod impact strength | |
|---|---|---|---|---|---|
| | Type | (parts) | (parts) | 23° C. | 0° C. |
| Comparative Example 6 | S-7 | 10 | 90 | 9.4 | 5.4 |

As apparent from the results shown in Table 5, it can be understood that the impact resistance was poor in the case of the graft copolymer (S-6) wherein (a) allyl methacrylate was not used and (b) a polyorganosiloxane component and a butyl acrylate component were not formed into a compound rubber was used.

EXAMPLES 8 AND 9

Example 1 was repeated to prepare test pieces except that the compound rubber type graft copolymer (S-7) or (S-8) prepared in Reference Example 5 was used.

The obtained test pieces were used to measure the Izod impact strength. The results are shown in Table 6.

TABLE 6

| | Compound rubber type type graft copolymer | | PVC | Izod impact strength | |
|---|---|---|---|---|---|
| | Type | (parts) | (parts) | 23° C. | 0° C. |
| Example 8 | S-7 | 10 | 90 | 168 | 38 |
| Example 9 | S-8 | 10 | 90 | 14.3 | 9.6 |

As apparent from the results shown in Table 6, it can be understood that the resin compositions according to the present invention were improved in their impact resistance at room temperature and at a low temperature.

EXAMPLE 10, AND COMPARATIVE EXAMPLES 7 AND 8

Example 1 was repeated to prepare test pieces except that the graft copolymer (S-9) prepared in Reference Example 6 was used.

The obtained test pieces were used to measure the Izod impact strength. The results are shown in Table 7.

TABLE 7

| | (Compound rubber type) Graft copolymer | | PVC | Izod impact strength | |
|---|---|---|---|---|---|
| | Type | (parts) | (parts) | 23° C. | 0° C. |
| Example 10 | S-1 | 70 | 30 | 171 | 169 |
| Comparative Example 7 | S-9 | 10 | 90 | 8.1 | 5.2 |
| Example 8 | S-9 | 70 | 30 | 54.2 | 6.3 |

As apparent from the results in Table 7, in case the graft silicone copolymer (S-9) was used, a polyvinyl chloride composition has a low impact strength even if it contained a large amount of the graft copolymer. On the other hand, however, in case the combined rubber type graft copolymer (S-1) of the present invention was used, a polyvinyl chloride composition has a higher impact strength at a room temperature and also at a low temperature.

We claim:

1. A vinyl chloride resin composition, comprising:
 (A) a vinyl chloride resin, and
 (B) a compound rubber graft copolymer
wherein one or more vinyl monomers are graft-polymerized onto a compound rubber that has an average particle diameter of 0.08 to 0.6 μm and possesses such a structure that 1 to 10 wt. % of a polyorganosiloxane rubber component and 90 to 99 wt. % of a polyalkyl (meth)acrylate rubber component are entangled in an inseparable fashion, and the total amount of the polyorganosiloxane rubber component and the polyalkyl (meth)acrylate rubber component is 100 wt. %.

2. A vinyl chloride resin composition according to claim 1, wherein said compound rubber comprises 3 to 10 wt. % of the polyorganosiloxane rubber component and 90 to 97 wt. % of the polyalkyl (meth)acrylate rubber component.

3. A vinyl chloride resin composition according to claim 2, wherein said compound rubber comprises 5 to 10 wt. % of the polyorganosiloxane rubber component and 90 to 95 wt. % of the polyalkyl (meth)acrylate rubber component.

4. A vinyl chloride resin composition according to claim 1, wherein said compound rubber comprises a polyorganosiloxane rubber component obtained by emulsion polymeization of an organosiloxane and a silane crosslinking agent, and a polyalkyl (meth)acrylate rubber component obtained by polymerizing a monomer mixture of an alkyl (meth)acrylate, a crosslinking agent and a graftlinking agent after having the polyorganosiloxane rubber component impregnated with the monomer mixture.

5. A vinyl chloride resin composition according to claim 1, wherein said compound rubber comprises a polyorganosiloxane rubber component obtained by emulsion polymerization of an organosiloxane, a silane crosslinking agent, and a silane graftlinking agent, and a polyalkyl (meth)acrylate rubber component obtained by polymerizing a monomer mixture of an alkyl (meth)acrylate, a crosslinking agent and a graftlinking agent after having the polyorganosiloxane component impregnated with the monomer mixture.

6. A vinyl chloride resin composition according to claim 1, wherein said main skeleton of the polyorganosiloxane rubber component has repeating units of dimethylsiloxane, and the main skeleton of the polyalkyl (meth)acrylate rubber component has repeating units of n-butyl acrylate.

7. A vinyl chloride resin composition according to claim 1, wherein the gel content of the compound rubber determined by extraction with toluene is higher than about 80 wt. %.

8. A vinyl chloride resin composition according to claim 1, wherein the vinyl monomer is an ester of methacrylic acid.

9. A vinyl chloride resin composition according to claim 8, wherein the ester of methacrylic acid is methyl methacrylate.

10. A vinyl chloride resin composition according to claim 1, wherein the composition comprises 97 to 60 wt. %, based on the weight of the composition, of (A) a vinyl chloride resin and 3 to 40 wt. %, based on the weight of the composition, of (B) a compound rubber graft copolymer.

* * * * *